(12) United States Patent
Ellyson et al.

(10) Patent No.: US 6,490,158 B1
(45) Date of Patent: Dec. 3, 2002

(54) MOTOR START CAPACITOR ASSEMBLY

(75) Inventors: Scott Clinn Ellyson, Decatur, GA (US); Charles Barry Ward, Alpharetta, GA (US)

(73) Assignee: Diversitech Corporation, Conyers, GA (US)

( * ) Notice: Subject to any disclaimer, the term of this patent is extended or adjusted under 35 U.S.C. 154(b) by 0 days.

(21) Appl. No.: 09/971,296

(22) Filed: Oct. 4, 2001

(51) Int. Cl.[7] ................................................. H05K 7/20
(52) U.S. Cl. .................... 361/690; 310/67 R; 338/22 R; 318/794; 361/27
(58) Field of Search .................. 318/783–794; 338/22 R, 22 SD, 224; 310/67 R, 91, 217; 361/24, 27, 29, 32, 264, 265, 752, 757, 600, 688–690, 641

(56) References Cited

U.S. PATENT DOCUMENTS

| 4,118,753 A | | 10/1978 | Vind | |
|---|---|---|---|---|
| 4,422,120 A | * | 12/1983 | Kobayashi et al. | 361/24 |
| 5,363,003 A | * | 11/1994 | Harada et al. | 310/67 R |
| 5,561,357 A | * | 10/1996 | Schroeder | 318/789 |

* cited by examiner

*Primary Examiner*—Gerald Tolin
(74) *Attorney, Agent, or Firm*—Smith, Gambrell & Russell, LLP

(57) ABSTRACT

A motor start capacitor assembly for providing an enclosure for a motor start capacitor and a thermistor electrically connected in series. The enclosure is constructed of a low temperature plastic case and cap with a high temperature plastic core for supporting the thermistor within the low temperature plastic case. The core holds the thermistor in a longitudinal orientation. The core and thermistor and related contacts are assembled without rivets or other fasteners.

9 Claims, 4 Drawing Sheets

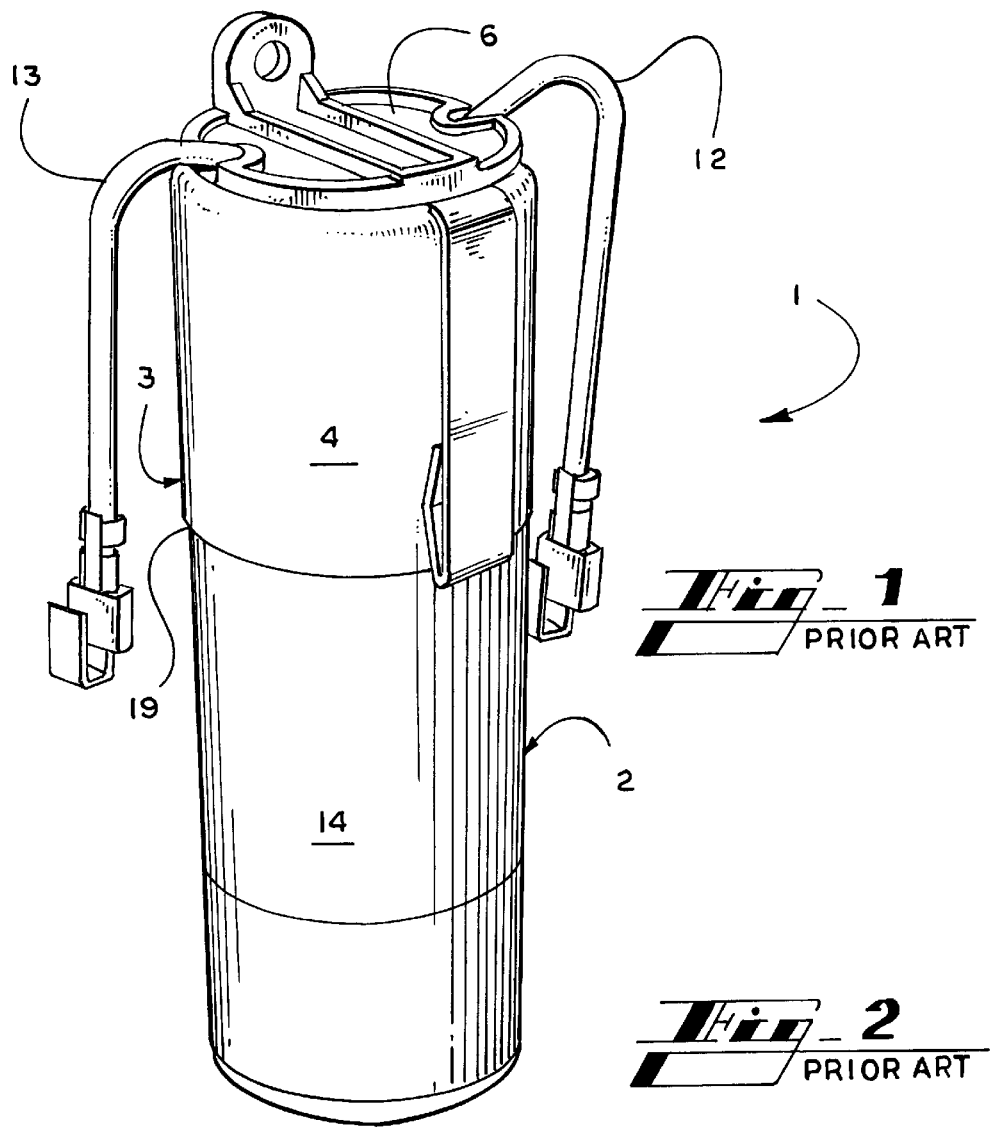
Fig_1 PRIOR ART
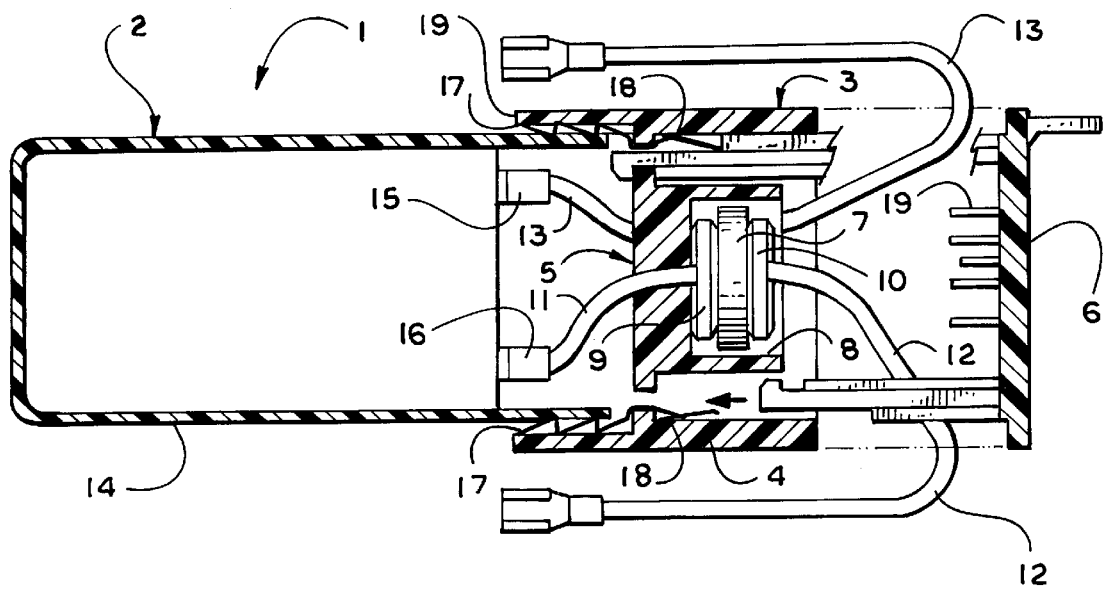
Fig_2 PRIOR ART

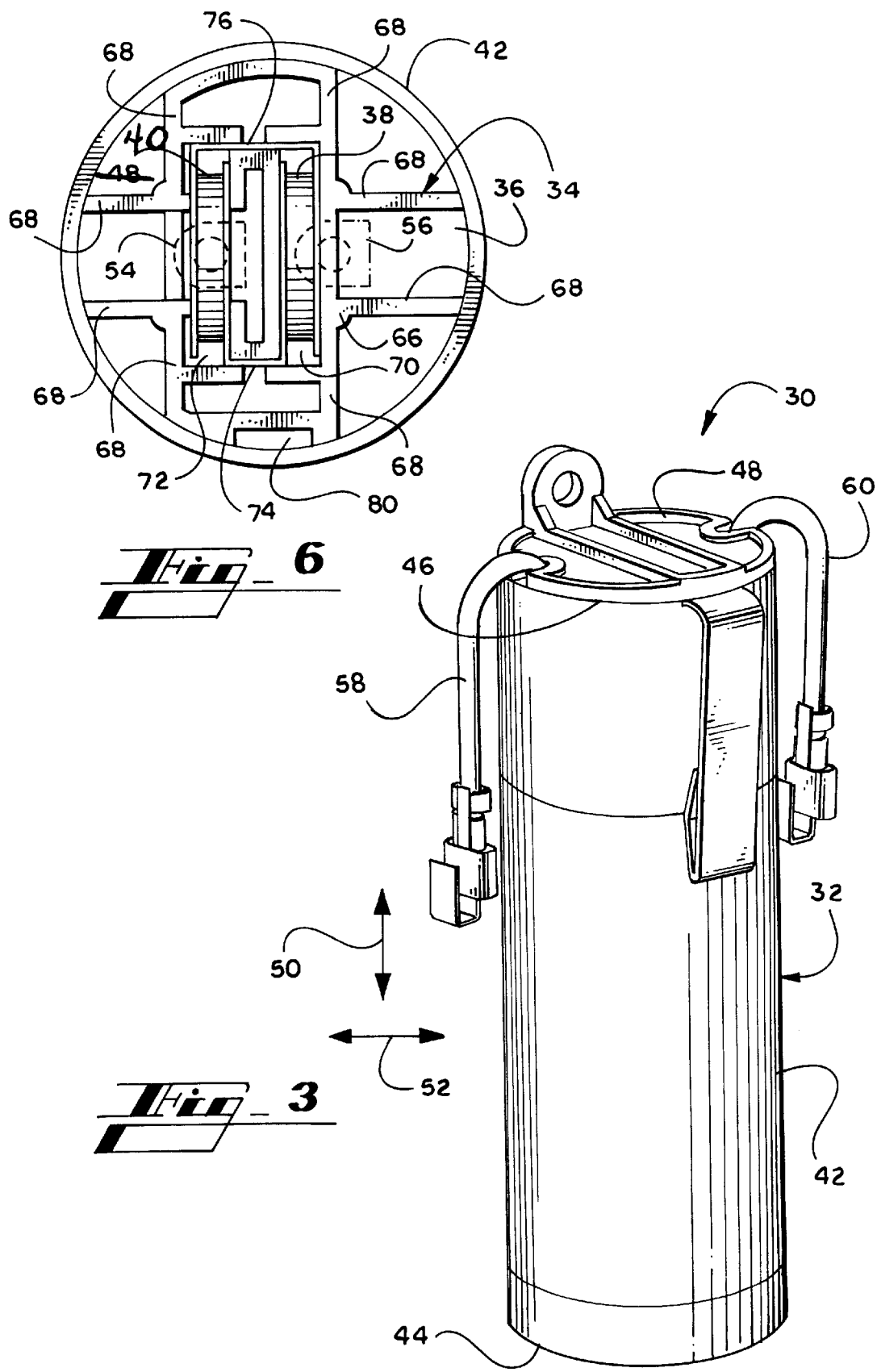

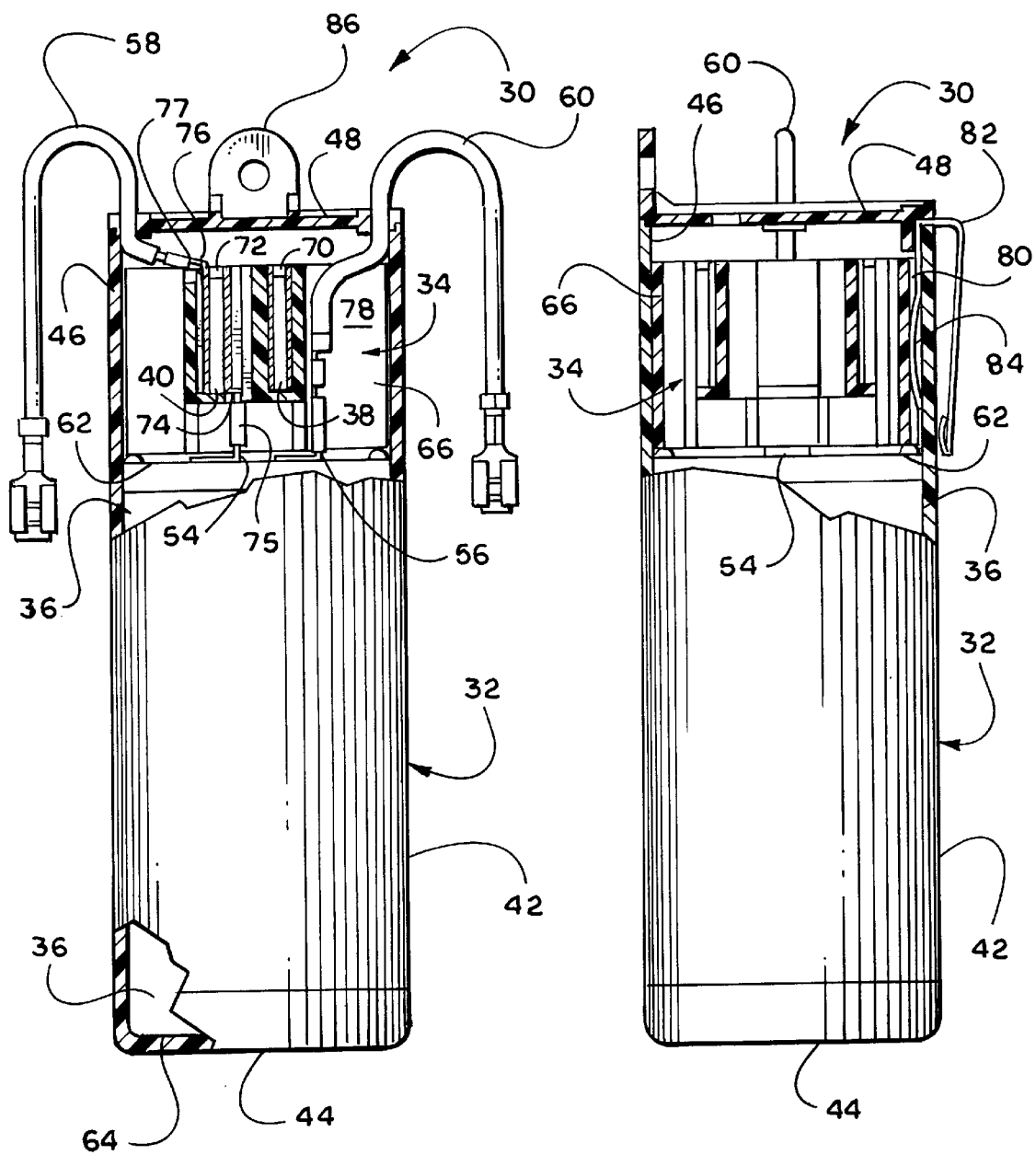
Fig_4   Fig_5

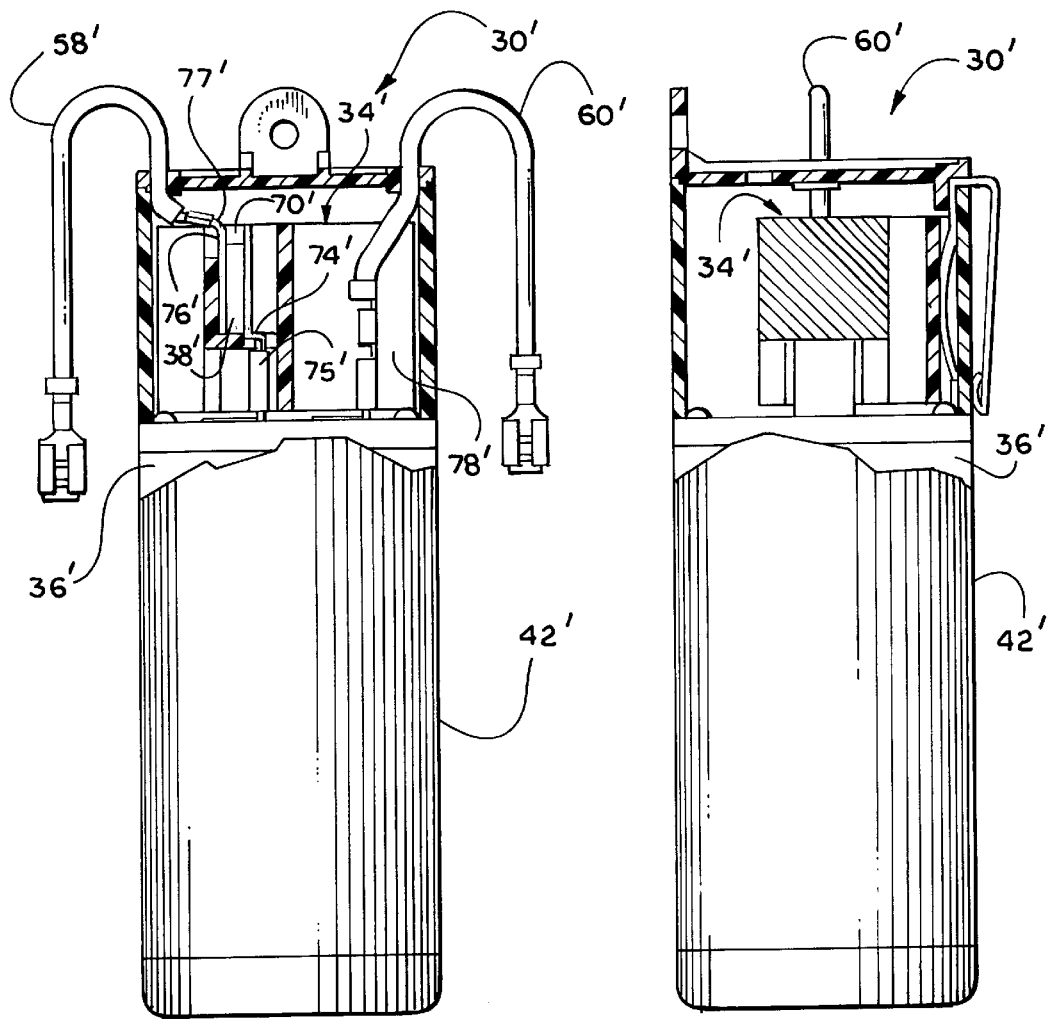
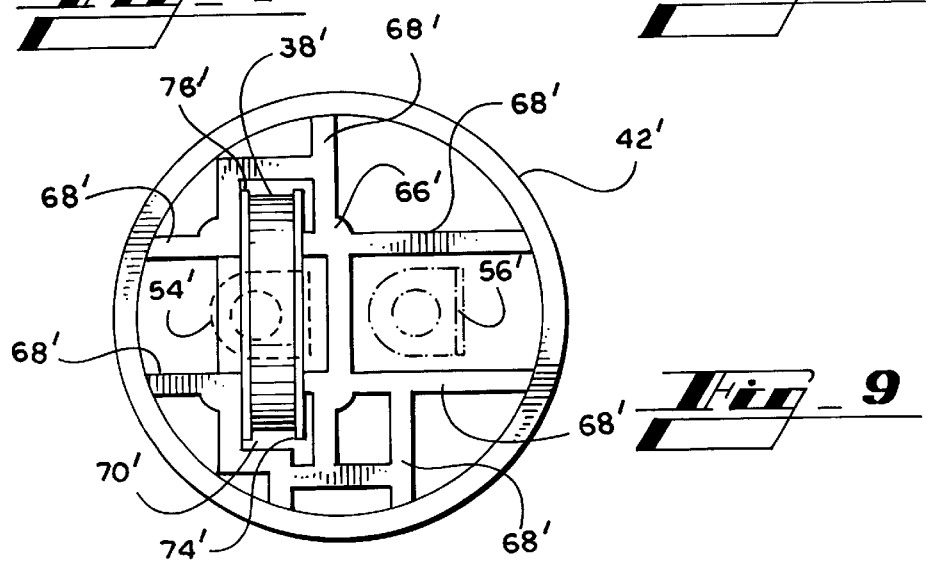

MOTOR START CAPACITOR ASSEMBLY

FIELD OF THE INVENTION

This invention relates to a start capacitor assembly for an AC motor, and more specifically relates to an enclosure for a capacitor and a thermistor electrically connected in series with the capacitor. The enclosure, including a case and a cap, is fabricated from a relatively low temperature plastic with a high-temperature plastic core for holding the thermistor.

BACKGROUND OF THE INVENTION

A single-phase permanent split-capacitor (PSC) induction motor is often used to drive a compressor for an air conditioning system. A PSC motor has two windings, a main winding and an auxiliary start winding. A capacitor, whose value is chosen as a compromise between start and run performance, is placed in series with the start winding. This capacitor also affects phase shift of the run windings and thus increases both starting and run torque, though it is not optimized for either. When power is applied, both windings contribute, aided by the phase shift of the capacitor, to the necessary torque to cause initial torque and acceleration. As the motor achieves operating speed, both windings continue to contribute to the motor's torque although the run winding now contributes to a far greater degree due to its lower impedance.

A conventional starting device for a PSC motor includes a capacitor in series with a positive temperature coefficient (PTC) resistor or thermistor. The resistance of this thermistor increases with rising temperature. The starting device, comprising a capacitor which is optimized for providing starting torque and a thermistor, is connected in parallel with the existing capacitor of the PSC motor. When power is connected to the motor, the ac current is connected to the windings on the motor through both the existing and the extra start capacitor (through the thermistor which has a low resistance when cold). As current flows to the windings through the capacitor and the thermistor, the thermistor heats up, and its resistance increases. The increased resistance of the heated thermistor reduces the current through the start capacitor. At some point, the temperature and current through the thermistor reach steady state, with only a very small current connected through the start capacitor to maintain the temperature of the thermistor.

The starting device of a capacitor and thermistor is generally packaged as a single unit with two wire leads for connection to the start winding of the motor. Because the thermistor remains hot during the normal operation of the motor, the enclosure for the capacitor and thermistor must be able to withstand the heat generated by the thermistor.

U.S. Pat. No. 4,118,753 discloses an enclosure for housing a starting device including a capacitor and thermistor. The enclosure includes an elongated cylindrical case which is closed at one end and closed by a cap at the opposite end. The enclosure has two transverse intermediate walls of heat insulating material that divide the enclosure into three sections along the longitudinal dimension of the enclosure. Each intermediate wall has a spring contact that extends into the center section between the intermediate walls. The thermistor is located between and engages the spring contacts. The thermistor is disk shaped with opposite sides being the electrical contacts for the thermistor. The thermistor is oriented with its axis extending parallel to the longitudinal dimension of the case. In order to hold the thermistor between the intermediate walls in engagement with the contact springs, a combination of standoffs and rivets are employed to maintain the spacing between the intermediate walls against the force exerted by the spring contacts. Thus the center section with the thermistor is separately fabricated with the standoffs and rivets prior to insertion into the case. The case within the center section has a vent hole for dissipation of heat. The vent hole will also allow access by moisture, dust, insects, and the like to the spring contacts and the thermistor. There is no specific disclosure concerning the plastic used for the enclosure other than the material of the case and the cap are the same material, and the intermediate walls are heat insulative.

Another prior art starting device is shown in FIGS. 1 and 2. The starting device 1 includes a plastic encased capacitor 2 topped by a plastic enclosure 3. The capacitor 2 has an outer cylindrical shell 14 and electric terminals 15 and 16. The plastic enclosure 3 comprises an outer cylindrical shell 4, an internal support structure 5, and a cap 6. A thermistor 7 is supported within recess 8 of the internal support structure 5 of the enclosure 3. The thermistor 7 is sandwiched between contacts 9 and 10 which are in turn connected to wires 11 and 12 respectively. The contacts 9 and 10 have spring elements and are held in contact with the thermistor 7 by protrusions 19 extending from the inside of cap 6. Thus the springs in the contacts 9 and 10 tend to force the cap 6 loose from the shell 4 of the enclosure 3. Therefore, during assembly, the cap 6 must be held against the spring force onto the shell 4 of the enclosure 3 during welding or gluing of the cap 6 to the shell 4. Wire 11 is connected to terminal 16 of capacitor 2, and wire 13 is connected to terminal 15 of capacitor 2. The enclosure 3, including the cylindrical shell 4, the internal support structure 5, and the cap 6, is made of high temperature plastic to withstand the heat generated by the thermistor 7. On the other hand the outer plastic shell 14 of the capacitor 2 is made of a low temperature plastic based on cost considerations. Because the shell 14 of the capacitor 2 and the enclosure 3 are made of different plastic materials, the capacitor shell 14 and the enclosure shell 4 cannot be reliably connected to each other by welding or gluing. Consequently, for the prior art starting device 1, the shell 14 of the capacitor 2 and the shell 4 of the enclosure 3 for the thermistor 7 are mechanically connected by a series of metal clips 17. The metal clips 17 engage the support structure 5 of the enclosure 3 by means of a tab 18. The clips 17 then frictionally engage the capacitor shell 14 by means of a series of sharp barbs along the length of each clip 17 which dig into the shell 14 and resist separation of the enclosure 3 from the capacitor 2. Because the attachment is mechanical, any leakage by the capacitor around its terminals will also leak out of the enclosure 3. In addition, because the enclosure fits over the shell 14 of the capacitor 2, a protruding flange 19 is created which is aesthetically objectionable and which makes the resulting assembly larger in diameter than the capacitor shell alone would be without the cap 6.

SUMMARY OF THE INVENTION

The present invention solves the above problems by providing an enclosure for a starting device comprising an outer case and cap both constructed of a low cost, low temperature plastic for enclosing the capacitor and the thermistor of the starting device. The case is cylindrical to accommodate the cylindrical shape of a conventional metal can starting capacitor. The case has a closed end and an open end to which the cap is fitted and substantially sealed. Because the cap and the case are made of the same low temperature plastic, attaching the cap to the case can be reliably accomplished by welding or gluing.

The thermistor is supported within the case by means of a core assembly. The core assembly consists of a high temperature molded plastic core which includes at least one chamber for accommodating the thermistor, and first and second electric contacts for engaging the terminals of the thermistor. The contacts are frictionally fitted on the sides of the chamber. The chamber in the molded plastic core is dimensioned so that when the disk shaped thermistor is inserted into the chamber, the thermistor is oriented with it thickness dimension (and axis) extending in the transverse dimension of the case, and the thermistor's diameter is oriented in the longitudinal direction of the case. Because the thermistor is oriented in the longitudinal direction of the case, the contact pressure between the contacts in the chamber and the thermistor is contained by the sides of the chamber. No pressure from the electric contacts is exerted on the case or cap of the enclosure.

Therefore, it is an object of the present invention to provide an enclosure for a starting device including a capacitor and thermistor connected in series.

More particularly it is an object of the present invention to provide a starting device enclosure with an outside case and cap that is constructed primarily of a low cost, low temperature plastic that may be glued or welded together.

It is further an object of the present invention to provide an enclosure with a core assembly for holding the thermistor that does not require any fasteners or the like to hold the thermistor in place.

It is also an object of the present invention to provide an enclosure with a core assembly for holding the thermistor in which the electric contact with the thermistor does not exert any pressure on the outside case or cap.

Further objects, features and advantages will become apparent upon consideration of the following detailed description of the invention when taken in conjunction with the drawing and the appended claims.

BRIEF DESCRIPTION OF THE DRAWINGS

FIG. 1 is a perspective view of a prior art motor start capacitor assembly.

FIG. 2 is a cross section view of the prior art motor start capacitor assembly of FIG. 1.

FIG. 3 is a perspective view of a motor start capacitor assembly in accordance with the present invention.

FIG. 4 is a front elevation view, partially in cross section, of a first embodiment of the motor start capacitor assembly in accordance with the present invention.

FIG. 5 is a front elevation view, partially in cross section and similar to FIG. 4, of the first embodiment of the motor start capacitor assembly in accordance with the present invention.

FIG. 6 is a top plan view of a core assembly for the first embodiment of the motor start capacitor assembly in accordance with the present invention.

FIG. 7 is a front elevation view, partially in cross section, of a second embodiment of the motor start capacitor assembly in accordance with the present invention.

FIG. 8 is a front elevation view, partially in cross section and similar to FIG. 7, of the second embodiment of the motor start capacitor assembly in accordance with the present invention.

FIG. 9 is a top plan view of a core assembly for the second embodiment of the motor start capacitor assembly in accordance with the present invention.

DETAILED DESCRIPTION OF THE PREFERRED EMBODIMENT

Referring now to the drawings, in which like reference numerals represent like parts throughout the several views, FIG. 3 discloses a motor start capacitor assembly 30. With reference to FIGS. 3, 4, 5, and 6, the motor start capacitor assembly 30 includes an enclosure 32, a core assembly 34, a capacitor 36, external wires 58 and 60, and, for the first embodiment of the present invention, two thermistors 38 and 40.

The enclosure 32 constitutes a cylindrical case 42 with a closed end 44 and an open end 46. A cap 48 is fitted to the open end 46 to close the case 42. The enclosure 32 further has a longitudinal dimension 50 and a transverse dimension 52 (FIG. 3). The case 42 and the cap 48 are molded from a low temperature, low cost plastic. Because the case 42 and the cap 48 are molded form the same plastic material, the cap can readily be jointed to the case by welding or gluing.

A plastic material that is suitable for molding the case 42 and the cap 48 is ABS (Acrylonitrile Butadiene Styrene). ABS is a general purpose plastic and possesses a specific gravity of 1.06, a tensile yield strength of 5,800 psi, and a heat deflection temperature of 190 degrees F. (at 264 psi). Consequently, ABS will deform readily with any significant loading above 190 degrees F. ABS has the further desirable property of being very easy to ultrasonically weld. Ultrasonic welding may be used to attach the ABS cap 48 to the ABS case 42. ABS is also easy to mold and costs approximately $0.32/lb at the time of filing this application. Other suitable low temperature plastics for the case 42 and cap 48 include polyolefins such as polyproplene or polyethylene.

The capacitor 36 is a conventional metal can capacitor used in motor starting devices. The capacitor 36 is cylindrical in shape, has a first end 62 and a second end 64, is housed in a metal can, and has terminals 54 and 56 located at the first end 62. The capacitor 36 fits within the case 42 with its second end 64 resting on the closed end 44 of the case 42.

The core assembly 34 supports the thermistors 38 and 40 inside of the case 42 and provides for electrical interconnection between the capacitor 36, the thermistors 38 and 40, and the external wire 58. The core assembly 34 includes a molded core 66 comprising a plurality of interconnected ribs 68 (FIG. 6). With continuing reference to FIG. 6, the ribs 68 form two chambers 70 and 72. U-shaped contacts 74 and 76 are press fit into the chambers 70 and 72 to provide electrical contact to the thermistors 38 and 40 within the chambers 70 and 72. The contact 74 includes a female connector 75, and the contact 76 includes a male connector 77. As best seen in FIGS. 4 and 6, the contact 74 is connected to the terminal 54 of the capacitor 36 by means of female connector 75. The contact 74 then contacts the right hand terminal of thermistor 40 and the left hand terminal of thermistor 38 as oriented in FIG. 6. The contact 76, on the other hand, contacts the left hand terminal of thermistor 40 and the right hand terminal of thermistor 38 as oriented in FIG. 6. The contact 76 is then connected to the wire 58 by means of male connector 77. The thermistors 38 and 40 are oriented in the chambers 70 and 72 so that the thermistors are electrically connected in parallel between the capacitor terminal 54 and the external wire 58. A channel 78 is also provide through the core 66 to accommodate connection of the wire 60 directly to the terminal 56 of the capacitor 36.

The chambers 70 and 72 are formed with a short dimension extending in the transverse direction 52 (FIG. 3). Consequently, when the thermistors 38 and 40 are installed in the chambers 70 and 72 respectively, the thickness of the thermistors is also in the transverse direction 52. The diameter of the disk shaped thermistors is oriented in the longitudinal direction 50 (FIG. 3).

A clip 82 is provided as a convenience for anchoring the motor start capacitor in place while in use. In order to install the clip 82, the core 66 also has a clip channel 80 to accommodate the clip 82. The clip 82 has a bent section 84 that engages the side of channel 80. Once the cap 48 is in place, the clip 82 is secured in the channel 80. The cap 48 also has a lug 86 which also may be used for anchoring the motor start capacitor in place while in use.

The core 66 is molded from a high temperature plastic, such as polybutylene terephthalate (PBT). One such PBT plastic that is useful for the present invention is manufactured by General Electric Company and sold under the trademark Valox. Valox is a polyester based compound. Valox has a specific gravity of 1.5, a tensile yield strength of 17,400 psi, and a heat deflection temperature of 302 degrees F. (at 264 psi). Valox molds at a very high temperature (about 500 degrees F.) and is thus more costly to process than the ABS that is used for the case 42 and cap 48. In addition Valox has a material cost of 5 to 6 times that of ABS. Another suitable plastic for the core 66 includes a plastic manufactured by General Electric Company and sold under the trademark Noryl. Noryl is a polyphenylene oxide and has similar properties to Valox.

The motor start capacitor assembly is simple and economic to manufacture. The case 42, the cap 48, and the core 66 are molded. The contacts 74 and 76 are press fit into the chambers 70 and 72, and the thermistors 38 and 40 are inserted into the chambers 70 and 72 in contact with contacts 74 and 76 to complete the assemble of the core assembly 34.

The core contact 74 of core assembly 34 is then connected to capacitor terminal 54 by means of the female connector 75. The wire 58 is connected to the male connector 77 of the contact 76. The wire 60 is connected directly to the terminal 56 of the capacitor 36.

The combination of the core assembly 34, the capacitor 36, and the connecting wires 58 and 60 are inserted into the case 42 as a unit. The clip 82 is inserted into the case along with the core assembly 34 and the capacitor 36. The cap 48 is then welded to the case 42 to complete the assembly. None of the internal connectors or parts exert any pressure on the cap 48 to cause the weld of the cap 48 to the case 42 to fail.

A second embodiment of the invention is shown in FIGS. 7, 8, and 9. The second embodiment of motor start capacitor assembly 30' differs from the first embodiment of the motor start capacitor assembly 30 in that only a single thermistor 38' is used instead of two thermistors 38 and 40. The motor start capacitor assembly 30' therefore has a different core assembly 34'.

The core assembly 34' supports the thermistor 38' inside of a low temperature molded plastic case 42' and provides for electrical interconnection between a capacitor 36', the thermistor 38', and an external wire 58'. The core assembly 34' includes a high temperature molded plastic core 66' comprising a plurality of ribs 68' (FIG. 9). With continuing reference to FIG. 9, the ribs 68' form a chamber 70'. Contacts 74' and 76' are fit into the chamber 70' to provide electrical contact to the thermistor 38'. The contact 74' includes a female connector 75', and the contact 76' includes a male connector 77'. The contact 74' is connected to the terminal 54' of the capacitor 36' by means of female connector 75'. The contact 74' then contacts the right hand terminal of thermistor 38' as oriented in FIG. 9. The contact 76', on the other hand, contacts the left hand terminal of thermistor 38' as oriented in FIG. 9. The contact 76' is then connected to the wire 58' by means of male connector 77'. A channel 78' is also provide through the core 66' to accommodate connection of wire 60' directly to terminal 56' of capacitor 36'.

The chamber 70' is formed with a short dimension extending in the transverse direction 52 (as shown in FIG. 3). Consequently, when the thermistor 38' is installed in the chamber 70', the thickness of the thermistor is also in the transverse direction 52. The diameter of the disk shaped thermistor is oriented in the longitudinal direction 50 (FIG. 3). The assembly of the motor start capacitor 30' is similar to that described above for the motor start capacitor 30.

While this invention has been described with reference to preferred embodiments thereof, it is to be understood that variations and modifications can be affected within the spirit and scope of the invention as described herein and before and as described in the appended claims.

We claim:

1. A motor start capacitor assembly comprising:

a. a capacitor having a first end, a second end, a transverse capacitor dimension, a longitudinal capacitor dimension, and a first terminal and a second terminal at the first end of the capacitor;

b. a capacitor enclosure comprising:
   i. a plastic case having a closed end, an open end, a transverse case dimension, and a longitudinal case dimension, wherein the transverse case dimension is greater than the transverse capacitor dimension to accommodate insertion of the capacitor into the case, and the longitudinal case dimension is greater than the longitudinal capacitor dimension;
   ii. a plastic cap dimensioned to engage the open end of the case; and c. a core assembly positioned within the case between the first end of the capacitor and the plastic cap, wherein the core assembly comprises:
   i. a plastic core having a plurality of interconnected ribs extending in the longitudinal direction of the case which ribs form at least one chamber with its shortest dimension extending in the transverse direction of the case;
   ii. a thermistor having
      (a) a long dimension and a thickness dimension and positioned in the chamber with the thickness dimension of the thermistor coinciding with the shortest dimension of the chamber;
      (b) first and second thermistor terminals; and
   iii. a first connector for connecting the first terminal of the capacitor to the first thermistor terminal
   iv. a second connector connected to the second thermistor terminal.

2. The motor start capacitor assembly of claim 1, wherein capacitor assembly further includes a wire assembly comprising a first wire connected to the second terminal of the capacitor and a second wire connected to the second connector.

3. The motor start capacitor assembly of claim 1, wherein the capacitor assembly further includes a clip locked between the open end of the case and the cap when the cap is in place on the open end of the case.

4. The motor start capacitor assembly of claim 1, wherein the core is made of a higher temperature plastic than the case.

5. The motor start capacitor assembly of claim 4, wherein the case, and the cap are made of the same plastic material.

6. The motor start capacitor assembly of claim 5, wherein case and cap are made of acrylonitrile butadiene styrene, and the core is made of a polyester based plastic.

7. The motor start capacitor assembly of claim 1, wherein the transverse dimension of the case is the same along the longitudinal dimension of the case.

8. The motor start capacitor assembly of claim 1, wherein the ribs and web are positioned so that the openings allow air to flow along the long dimension of the chamber and therefore along the long dimension of the thermistor.

9. The motor start capacitor assembly of claim 1, wherein the core has two chambers for holding thermistors.

* * * * *